United States Patent [19]

Obara

[11] Patent Number: 5,828,150
[45] Date of Patent: Oct. 27, 1998

[54] HARD DISC DRIVE WITH A COMPOUND BEARING ASSEMBLY

[75] Inventor: Rikuro Obara, Nagano-ken, Japan

[73] Assignee: Minebea Kabushiki-Kaisha, Nagano-ken, Japan

[21] Appl. No.: 732,764

[22] Filed: Oct. 18, 1996

[30] Foreign Application Priority Data

Oct. 20, 1995 [JP] Japan ..................................... 7-297391

[51] Int. Cl.$^6$ .............................. H02K 5/16; F16C 33/02
[52] U.S. Cl. .............................. 310/90; 384/276; 384/424
[58] Field of Search .............................. 310/90; 384/154, 384/126, 276, 424

[56] References Cited

U.S. PATENT DOCUMENTS

| | | | |
|---|---|---|---|
| 3,826,545 | 7/1974 | McKee | 308/189 R |
| 4,934,843 | 6/1990 | Nakanishi | 384/613 |
| 5,160,866 | 11/1992 | Hishida et al. | 310/90 |
| 5,510,661 | 4/1996 | Yoshimura et al. | 310/90 |

Primary Examiner—Thomas M. Dougherty
Assistant Examiner—Timothy A. Williams
Attorney, Agent, or Firm—Lowe Hauptman Gopstein Gilman & Berner

[57] ABSTRACT

A hard disc drive is disclosed, which comprises a compound bearing assembly including a stepped shaft 1 having a large-diameter portion 1a and a small-diameter portion 1b, the large-diameter portion 1a having an inner raceway groove 2a formed in the outer periphery, an outer race ring 3 surrounding the large-diameter portion 1a and having an outer raceway groove 2b, a plurality of balls 4 provided between the inner and outer raceway grooves 2a and 2b, a ball bearing unit 5 having an inner and an outer race ring 5a and 5b and a plurality of balls 6 provided therebetween, the inner race ring 5a being fitted on the small-diameter portion 1b, and a sleeve-like spacer 7 surrounding the stepped shaft 1 and having opposite end small-diameter portions, the outer race ring 3 and the outer race ring 5b of the ball bearing unit 5 being fitted on the opposite end small-diameter portions, respectively. The bearing assembly is provided as a complete product and assembled by the hard disc drive manufacturer in the hard disc drive motor by fitting it on a rotor hub thereof.

3 Claims, 3 Drawing Sheets

HARD DISC DRIVE WITH A COMPOUND BEARING ASSEMBLY

BACKGROUND OF THE INVENTION

1. Field of the Invention

This invention relates to improvements in a hard disc drive motor.

2. Description of the Prior Art

In a prior art hard disc drive motor, a bearing assembly is provided between a motor shaft and a rotor hub.

A prior art compound bearing assembly, as shown in FIGS. 5(a) and 5(b), comprises two ball bearing units A and B and a sleeve-like spacer C. These components are produced separately and supplied to the user, i.e., a hard disc drive manufacturer, for assembling on a motor shaft D.

As shown, with the conventional bearing assembly of the motor in the hard disc drive, it is necessary for the hard disc drive manufacturer to assemble the two ball bearing units on the motor shaft via a spacer. This poses the following problems.

(a) The motor shaft has to be prepared with its outer diameter sized to the inner race rings of the ball bearing units.

(b) The spacer is a separate component from the two ball bearing units, and to be able to fit the dimensions of the ball bearing units to be assembled with it the parallelism between and flatness of its opposite end portions should be highly accurate, thus requiring highly accurate finishing.

(c) Since the spacer is only clamped between the outer race rings of the two ball bearing units, when it is assembled by the user, highly accurate assembling is required to make it and the motor shaft to be concentric.

(d) Unless all the above requirements are fully met, vibrations of the motor shaft and the disc may result, it is impossible to obtain a hard disc drive having excellent rotational performance, but vibrations of the motor shaft or the disc may result.

SUMMARY OF THE INVENTION

An object of the invention is to provide a hard disc drive having improved performance, which can solve the problems discussed above and is obtained such that a compound bearing assembly having been obtained as a complete product after assembling of components is used for its motor by its manufacturer.

A hard disc drive according to the invention comprises a compound bearing assembly including a stepped shaft having a large-diameter portion and a small-diameter portion, the large-diameter portion having an inner raceway groove directly formed in the outer periphery, an outer race ring surrounding the large-diameter portion of the stepped shaft and having an outer raceway groove, a plurality of balls provided between the inner and outer raceway grooves, a ball bearing unit having an inner and outer race ring and a plurality of balls provided therebetween, the inner race ring of the ball bearing unit being fitted on the small-diameter portion of the stepped shaft, and a sleeve-like spacer surrounding the stepped shaft and having opposite end small-diameter portions, the outer race ring surrounding the large-diameter portion and the outer race ring of the ball bearing unit being fitted on the opposite end small-diameter portions, respectively, the outer race ring, the sleeve-like spacer and the ball bearing unit being assembled together with the stepped shaft into the compound bearing assembly, a lower end of the stepped shaft secured to a base of a casing of the hard disc drive at right angles, a motor of the hard disc drive having a rotor having a central hub thereof fitted on and secured to the compound bearing assembly.

In an embodiment of the invention, the inner race ring of the ball bearing unit and the large-diameter portion of the stepped shaft have an equal outer diameter, and the outer race ring of the ball bearing unit have equal outer and inner diameters to the outer and inner diameters, respectively, of the outer race ring surrounding the large-diameter portion, so that all the balls are the same in diameter.

DETAILED DESCRIPTION OF THE PREFERRED EMBODIMENTS

Figure 4:
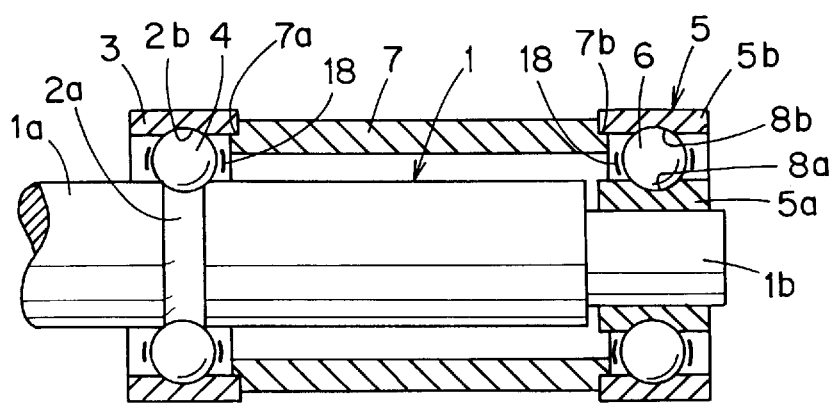
FIG. 4 is a sectional view showing the bearing assembly of a motor used for the hard disc drive according to the invention.
Figure 5A:
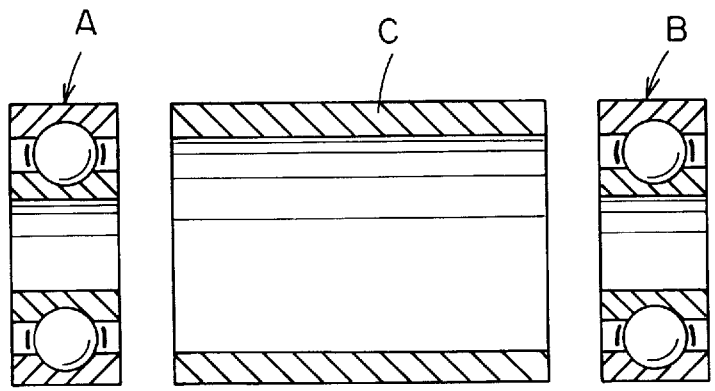
FIGS. 5(a) and 5(b) are sectional views showing a prior art bearing assembly, FIG. 5(a) showing two ball bearing units and a spacer before assembling, FIG. 5(b) showing the ball bearing units and spacer assembled on a motor shaft.
Figure 5B:
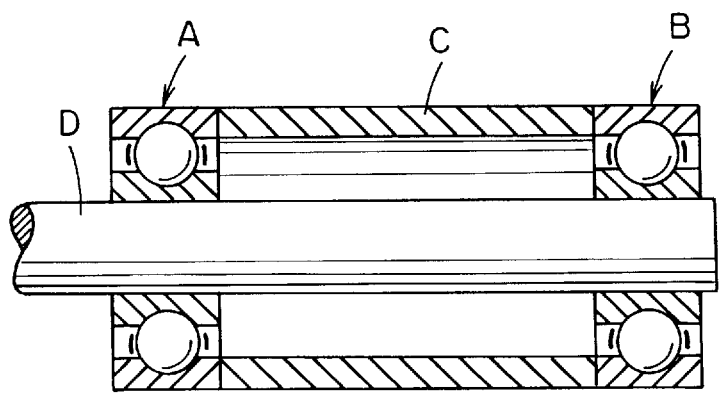

The hard disc drive according to the invention uses a novel bearing assembly as shown in FIG. 4 as a motor bearing assembly. This bearing assembly will now be described. Referring to FIG. 4, reference numeral 1 designates a stepped shaft which has a large-diameter portion 1a and a small-diameter portion 1b, the large-diameter portion 1a having an inner raceway groove 2a directly formed in the outer periphery.

Reference numeral 3 designates an outer race ring provided on the large-diameter portion 1a. The outer race ring 3 is assembled on the large-diameter portion 1a with a plurality of balls 4 provided between an outer raceway groove 2b formed in its inner periphery and the inner raceway groove 2a of the large-diameter portion 1a.

A ball bearing unit 5 having a conventional structure, having an inner and an outer race ring 5a and 5b and a plurality of balls 6 provided therebetween, has its inner race ring 5a fitted on and secured to the small-diameter portion 1b of the stepped shaft 1.

Reference numeral 7 designates a sleeve-like spacer surrounding the stepped shaft 1. The spacer 7 has opposite end small-diameter portions 7a and 7b, which have such an outer diameter that they properly fit in the outer race rings 3 and 5b, respectively. The spacer 7 is secured in position by fitting its small-diameter portions 7a and 7b in the outer race ring 3 and the outer race ring 5b of the ball bearing unit 5, respectively.

The inner race ring 5a of the ball bearing unit 5 has an equal outer diameter to the outer diameter of the large-diameter portion 1a of the stepped shaft 1, and the outer race ring 5b of the ball bearing unit 5 has equal outer and inner diameters to those of the outer race ring 3 on the large-diameter portion 1a, so that the balls 4 and 6 are the same in diameter.

In assembling, the inner race ring 5a of the ball bearing unit 5 is initially slidably fitted on the small-diameter portion 1b of the stepped shaft 1. Then, an adequate pre-load is applied to the outer or right end surface, in FIG. 4, of the inner race ring 5a, and in this state the inner race ring 5a is secured by means of an adhesive to the small-diameter portion 1b of the stepped shaft 1. In this way, the outer race ring 3, the spacer 7 and the ball bearing unit 5 are assembled on the stepped shaft 1.

Reference symbols 8a and 8b designate the raceway grooves of the inner and outer race rings 5a and 5b of the ball bearing unit 5.

While in the above embodiment the balls 4 and 6 were the same in diameter, it is possible to use balls having different diameters for the sides of the large- and small-diameter portions 1a and 1b.

Figure 2:
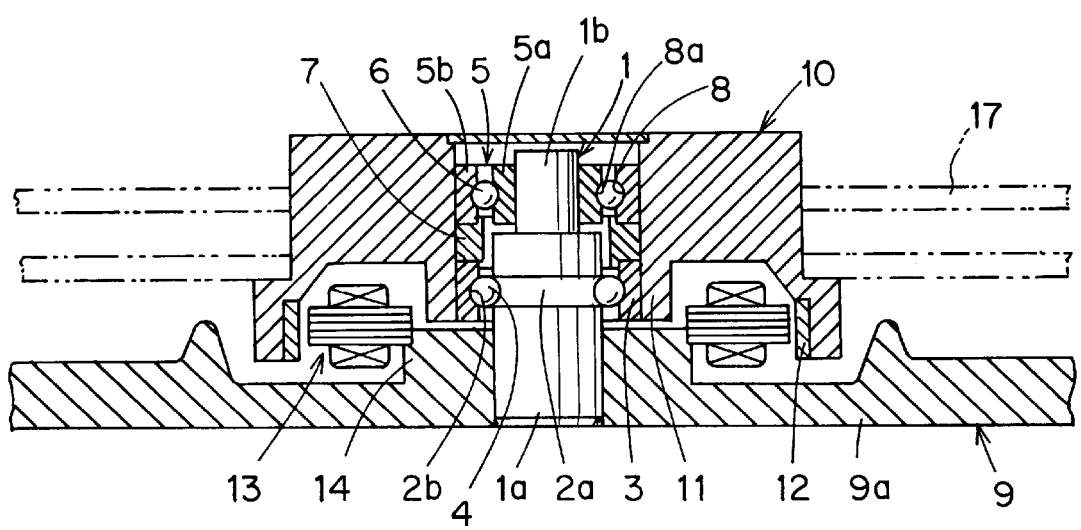
FIG. 2 is a sectional view showing an embodiment of an outer rotor type motor in the hard disc drive according to the invention.
Figure 3:
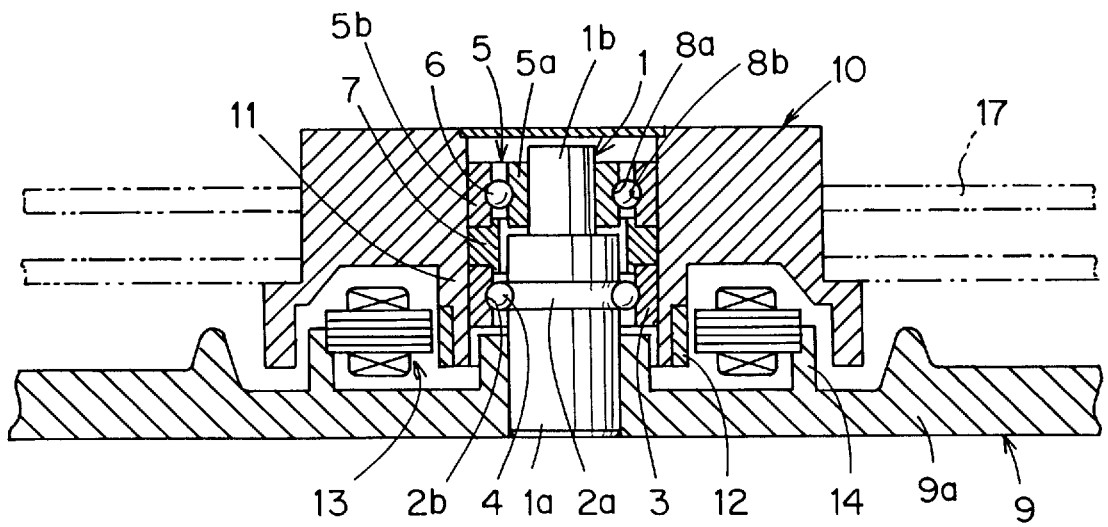
FIG. 3 is a sectional view showing an embodiment of an inner rotor type motor in the hard disc drive according to the invention.

As shown in FIG. 2, the lower end of the stepped shaft 1 in the bearing assembly completed in the above way is secured to a base 9a of a casing 9, and then a central hub 11 of a rotor 10 of a motor is fitted on and secured to the outer race rings 3 and 5b of the bearing assembly.

Figure 1:
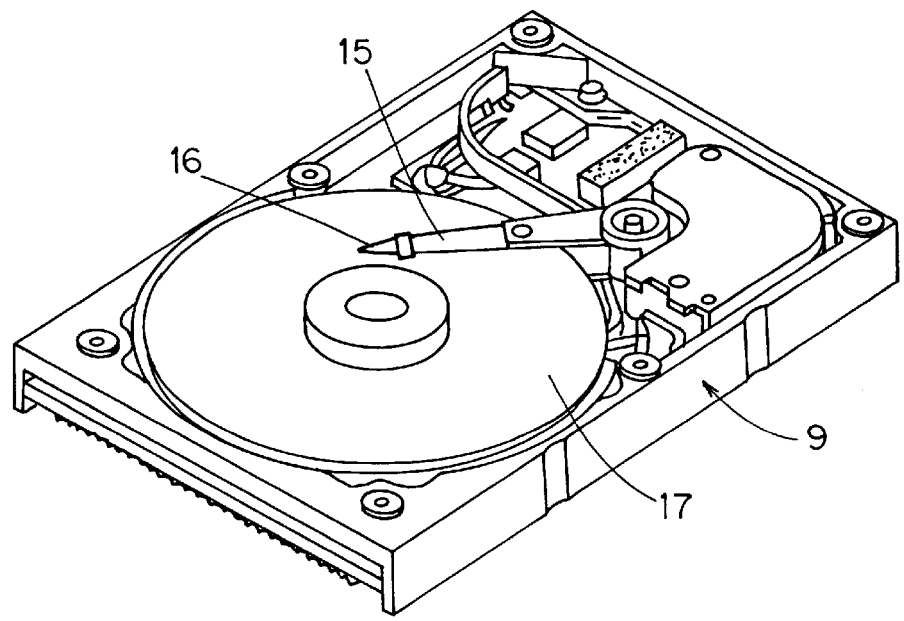
FIG. 1 is a perspective view showing a hard disc drive.

Reference numeral 12 designates a magnet, 13 a stator yoke with an energizing coil wound thereon, and 14 a yoke holder. In FIG. 1, reference numeral 15 designates a swing arm with a magnetic head 16 mounted at the end, and 17 a magnetic disc.

While the above embodiment concerns an outer rotor type motor in which the magnet 12 is provided on the inner periphery of the hub 11 of the rotor 10, the invention is also applicable to an inner rotor type motor in which the magnet is provided on the outer periphery of the rotor hub.

The hard disc drive according to the invention, with the bearing assembly of the motor having the construction as described in the foregoing, the following advantageous functions and effects are obtainable.

(1) Since the ball bearing unit, the outer race ring, the balls, the sleeve-like spacer and the stepped shaft of the compound bearing assembly are assembled together by the bearing manufacturer, it is not necessary for the user to assemble these components, and the rotor of the motor can be readily mounted on the bearing assembly by fitting and securing the hub of the motor with respect to the outer race rings of the bearing assembly.

(2) It is thus possible to provide a hard disc drive, which can minimize vibrations of the motor shaft and the disc.

(3) Since the large-diameter portion of the stepped shaft in the bearing assembly according to the invention has the inner raceway groove directly formed in its outer periphery, the conventional inner ring is unnecessary, and correspondingly the shaft is partly increased in diameter to provide the stepped shaft, which thus has increased rigidity.

(4) Since the stepped shaft has the large-diameter portion and has increased rigidity, the resonance point of the shaft can be made high compared to those of the other components to prevent resonance with the other components and thus improve the performance and reliability of the motor.

(5) The bearing assembly according to the invention need only a single conventional bearing unit, and hence only a single inner race ring, and it can comprise a reduced number of components.

(6) Since the large-diameter portion of the stepped shaft has the inner raceway groove directly formed in its outer periphery, no inner race ring is needed for the large-diameter portion side. The necessity of no inner race ring permits corresponding reduction of the outer diameter of the outer race ring. It is thus possible to provide a compact hard disc drive as desired.

What is claimed is:

1. A hard disc drive including a motor, comprising a compound bearing assembly including:

a stepped shaft having a large-diameter portion and a small-diameter portion, said large-diameter portion having an inner raceway groove directly formed in an outer periphery thereof;

a first outer race ring surrounding said large-diameter portion of said stepped shaft and having an outer raceway groove;

a plurality of balls provided between said inner and outer raceway grooves;

a ball bearing unit having an inner race ring, a second outer race ring and a plurality of balls provided therebetween, said inner race ring being fitted on said small-diameter portion of said stepped shaft; and a sleeve-like spacer surrounding said stepped shaft and between said first and second outer race rings, said sleeve-like spacer having a central portion with a first diameter and opposite end portions at opposite ends thereof having a second diameter smaller than said first diameter, said first and second outer race rings being fitted on said opposite end portions of said sleeve-like spacer, respectively;

said sleeve-like spacer having a stepped cross section wherein said opposite end portions form steps with said central portion, said first and second outer rings positioned on said steps at said opposite end portions of said sleeve-like spacer;

said first outer race ring, said sleeve-like spacer and said ball bearing unit being assembled into said compound bearing assembly, a lower end of said stepped shaft secured to a base of a casing of the hard disc drive at a right angle thereto, said motor of the hard disc drive having a rotor with a central hub thereof fitted on and secured to said compound bearing assembly.

2. A hard disc drive comprising a compound bearing assembly including:

a stepped shaft having a large-diameter portion and a small-diameter portion, said large-diameter portion having an inner raceway groove directly formed in the outer periphery;

an outer race ring surrounding said large-diameter portion of said stepped shaft and having an outer raceway groove;

a plurality of balls provided between said inner and outer raceway grooves;

a ball bearing unit having an inner race ring and an outer race ring and a plurality of balls provided therebetween, said inner race ring of said ball bearing unit being fitted on said small-diameter portion of said stepped shaft; and a sleeve-like spacer surrounding said stepped shaft and having opposite end small-diameter portions, said outer race ring surrounding said large-diameter portion and said outer race ring of said ball bearing unit being fitted on said opposite end small-diameter portions of said sleeve-like spacer, respectively;

said sleeve-like spacer having a stepped cross section wherein said opposite end small diameter portions form steps with a central portion, said outer race ring surrounding said large-diameter portion and said outer race ring of said ball bearing unit being positioned on said steps at said opposite end portions of said sleeve-like spacer;

said outer race ring, said sleeve-like spacer and said ball bearing unit being assembled into said compound bearing assembly, said large-diameter portion of said stepped shaft having a stem thereof secured to a base member of the hard disc drive at right angles, a motor of the hard disc drive having a rotor having a central hub thereof fitted on and secured to said compound bearing assembly.

3. The hard disc drive assembly according to claim 2, wherein said inner race ring of said ball bearing unit and said large-diameter portion of said stepped shaft having an equal outer diameter, and said outer race ring of said ball bearing unit having equal outer and inner diameters to the outer and inner diameters, respectively, of said outer race ring surrounding said large-diameter portion, so that all said balls have a common diameter.

* * * * *